United States Patent [19]

Ogawa

[11] Patent Number: 4,520,770
[45] Date of Patent: Jun. 4, 1985

[54] AUTOMOTIVE INTERNAL COMBUSTION ENGINE WITH BEARING BEAM STRUCTURE

[75] Inventor: Naoki Ogawa, Yokohama, Japan

[73] Assignee: Nissan Motor Co., Ltd., Yokohama, Japan

[21] Appl. No.: 428,268

[22] Filed: Sep. 29, 1982

[30] Foreign Application Priority Data

Oct. 7, 1981 [JP] Japan .............. 56-148918[U]

[51] Int. Cl.³ .............................................. F02F 7/00
[52] U.S. Cl. ................. 123/195 H; 123/198 E; 384/429; 384/432
[58] Field of Search .......... 123/195 R, 195 C, 195 H, 123/198 E; 384/429, 432, 433, 434

[56] References Cited

U.S. PATENT DOCUMENTS

| | | | |
|---|---|---|---|
| 2,098,451 | 11/1937 | Gilmore | 123/195 R |
| 2,865,341 | 12/1958 | Dolza | 123/195 R |
| 2,963,009 | 12/1960 | Dolza | 123/198 E |
| 3,089,735 | 5/1963 | Mann | 123/195 R |
| 3,464,398 | 9/1969 | Scheiterlein et al. | 123/195 R |
| 4,213,440 | 7/1980 | Abe et al. | 123/195 C |
| 4,265,495 | 5/1981 | Backlin | 384/429 |

FOREIGN PATENT DOCUMENTS

| | | | |
|---|---|---|---|
| 0472638 | 4/1947 | Belgium . | |
| 0038560 | 4/1981 | European Pat. Off. | 123/195 C |
| 524880 | 4/1931 | Fed. Rep. of Germany . | |
| 1751124 | 10/1972 | Fed. Rep. of Germany . | |
| 2257651 | 11/1982 | Fed. Rep. of Germany . | |
| 2410135 | 6/1979 | France . | |
| 0695554 | 8/1953 | United Kingdom . | |
| 1294766 | 11/1972 | United Kingdom . | |
| 1328196 | 8/1973 | United Kingdom | 123/195 H |
| 1481139 | 7/1977 | United Kingdom . | |

OTHER PUBLICATIONS

Ricardo, "The High-Speed Internal-Combustion Engine" (1941).
Barnes-Moss et al., "The Design and Development of a Heavy-Duty, Off-Highway Diesel Engine Family", Society of Automotive Engineers, Off-High Vehicle Meeting & Exhibition, MECCA, (1977).
Schellmann et al., "Der Porsche-V8-Motor Typ 928", MTZ Motor-Technische Zeitschrift, 38, (1977), 7/8.

*Primary Examiner*—Craig R. Feinberg
*Assistant Examiner*—David A. Okonsky
*Attorney, Agent, or Firm*—Schwartz, Jeffery, Schwaab, Mack, Blumenthal & Koch

[57] ABSTRACT

An automotive internal combustion engine comprises a cylinder block having a plurality of bearing sections, and a bearing beam structure secured to the bottom part of the cylinder block. The bearing beam structure includes a plurality of main bearing cap sections each of which associates with a respective cylinder block bearing section to rotatably support the journal of a crankshaft. First and second beam sections are formed at the upper corner portions of each bearing cap section to securely connect the bearing cap sections with each other. Additionally, first and second side wall sections are respectively formed along the opposite side portions of each bearing cap section to securely connect the bearing cap sections with each other. The first and second side wall sections are integral with the first and second beam sections, respectively. Therefore, vibration of the bearing beam structure and the cylinder block can be effectively suppressed, thereby achieving total engine noise reduction.

8 Claims, 11 Drawing Figures

AUTOMOTIVE INTERNAL COMBUSTION ENGINE WITH BEARING BEAM STRUCTURE

BACKGROUND OF THE INVENTION

1. Field of the Invention

This invention relates to a low noise level automotive internal combustion engine, and more particularly to an engine equipped with a bearing beam structure for supporting a crankshaft in a manner to improve the mechanical strength of a cylinder block.

2. Description of the Prior Art

In connection with engine noise, noise emitted from a cylinder block skirt section or oil pan is mainly caused by vibration of the cylinder block itself. In order to reduce vibration induced noise, it seems enough to suppress the vibration, due to explosion torque which is applied to a crankshaft, by increasing the rigidity of the cylinder block. However, this unavoidably leads to an increase in cylinder block wall thickness and accordingly to a considerable increase in engine weight, thereby giving rise to new problems such as increased fuel consumption. In view of this, a variety of approaches have been made to improve the rigidity of the cylinder block while minimizing any increase in cylinder block weight. In connection with one of these approaches, attention has been paid to the employment of a bearing beam structure which securely connects a plurality of bearing caps for supporting the crankshaft, in order to improve the mechanical strength of bearing caps and engine parts associated with them.

BRIEF SUMMARY OF THE INVENTION

An automotive internal combustion engine according to the present invention comprises a cylinder block having a plurality of bearing sections. A bearing beam structure is secured to the bottom part of the cylinder block and includes a plurality of main bearing cap sections, each of which is associated with a respective cylinder block bearing section to rotatably support the journal of a crankshaft. First and second beam sections are respectively formed at the opposite upper corner portions of each bearing cap section to securely connect the bearing cap sections with each other. Additionally, first and second side wall sections are respectively formed along the opposite side positions of each bearing cap section to securely connect the bearing cap sections with each other. The first and second side wall sections are integral with the first and second beam sections, respectively.

Therefore, not only is the bearing beam structure itself improved in strength and rigidity, but also the cylinder block is improved in rigidity by virtue of rigid connection with the bearing beam structure, remarkably reducing vibration noise from the bearing beam structure and from the cylinder block.

BRIEF DESCRIPTION OF THE DRAWINGS

The features and advantages of the automotive internal combustion engine according to the present invention will be more appareciated from the following description taken in conjunction with the accompanying drawings in which like reference numerals and characters designate like parts and elements, in which.

DETAILED DESCRIPTION OF THE INVENTION

Figure 1:
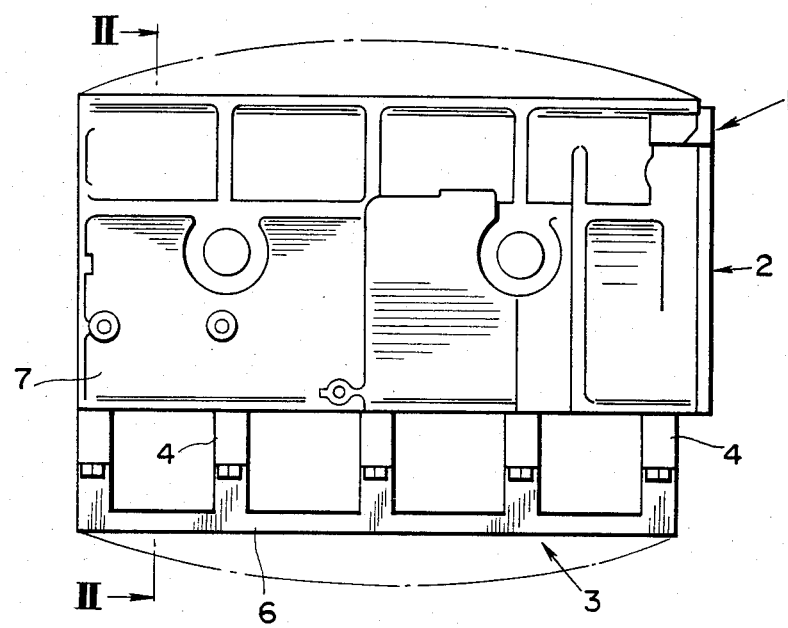
FIG. 1 is a front elevation of a conventional automotive internal combustion engine.
Figure 2:
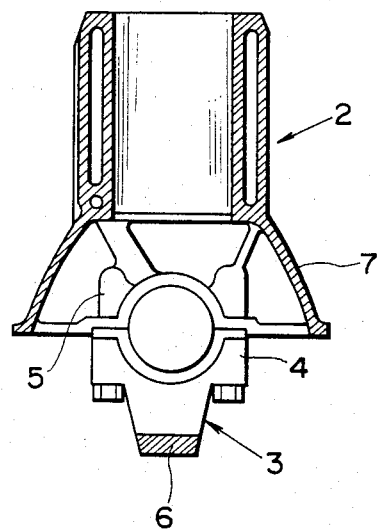
FIG. 2 is a vertical sectional view taken in the direction of arrows substantially along the line II—II of FIG. 1.
Figure 3:
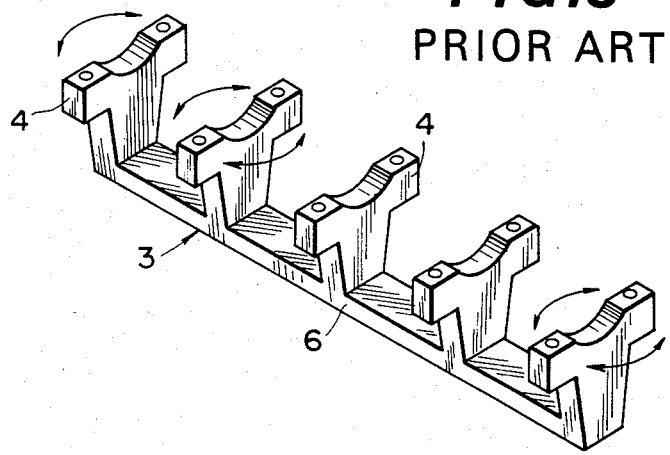
FIG. 3 is a perspective view of a conventional bearing beam structure used in the engine of FIG. 1.
Figure 4:
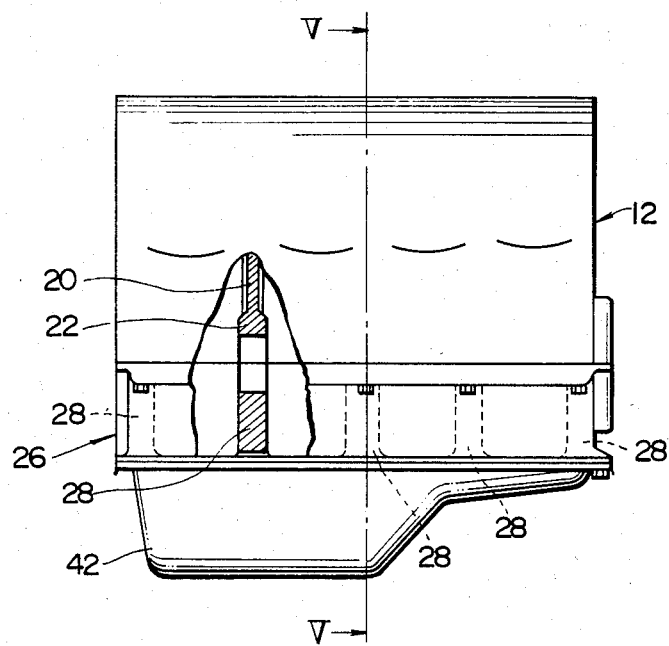
FIG. 4 is a front elevation, partly in section, of a preferred embodiment of an automotive internal combustion engine in accordance with the present invention.

To facilitate understanding the invention, a brief reference will be made to an engine block 1 of a conventional automotive internal combustion engine, depicted in FIGS. 1 to 3. Referring to FIGS. 1 and 2, the engine block 1 includes a cylinder block 2, and a bearing beam structure 3 secured to the bottom part of the cylinder block 2 by means of bolts. The bearing beam structure 3 has a plurality of main bearing cap sections 4 each of which is associated with a respective bearing section 5 or main bearing bulkheads of the cylinder block 2, as shown in FIG. 3. The associated bearing cap sections 4 and cylinder block bearing sections 5 rotatably support the journal of a crankshaft (not shown). The bearing cap sections 4 are securely or integrally connected with each other through a beam section 6 extending along the axis of the crankshaft, to increase the rigidity of the engine block 1. Therefore, the engine block 1 is considerably improved in flexural rigidity against the flexural vibration indicated in phantom in FIG. 1 and against vibration of the bearing cap sections 4 in the axial direction of the crankshaft or in the forward-and-rearward direction, which, vibrations act on each bearing cap section 4 to cause it to come down.

However, with the above-mentioned arrangement, although the flexural rigidity of the engine block 1 is increased in the direction perpendicular to the crankshaft axis, a desired low level of engine noise cannot be attained because of mere contribution to slightly raising the resonance frequency of the cylinder block.

Furthermore, even if each main bearing cap section 4 is prevented from the vibration in the forward-and-rearward direction to cause it to come down, it is not effective for suppressing the vibration of a cylinder block skirt section 7, which bulges outwardly to define an upper side section of a crankcase (not identified), in the lateral direction or in the open-and-close direction of movement. Accordingly, the above-mentioned arrangement is not sufficiently effective in preventing noise generation from the skirt section 7 and an oil pan (not shown) securely attached to the bottom edge of the skirt section 7.

It has been also revealed that the lateral vibration of the cylinder block skirt section 7 is induced by the movements of bearing cap sections 4 and the bearing bulkheads 5 due to their torsional vibration around the crankshaft axis and flexural vibration in the right-andleft direction as viewed in plan or in the direction indicated by arrows in FIG. 3. Such movements combine with each other and excite the vibration of the cylinder block skirt section 7 and the oil pan. In order to suppress such vibrations, the above-mentioned conventional bearing beam structure 3 is not sufficiently effective and only results in relatively low noise reduction effect in comparison to the weight increase involved.

Figure 5:
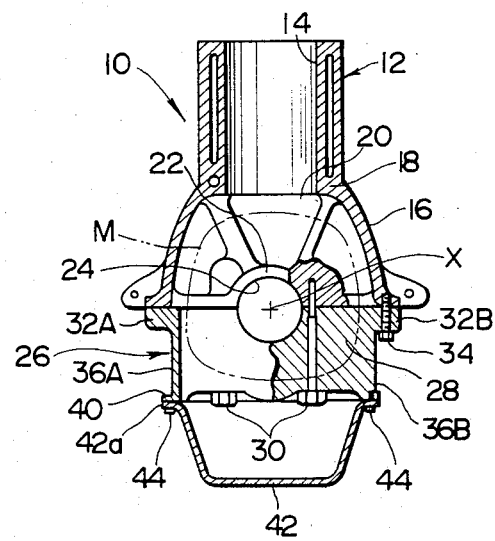
FIG. 5 is a vertical sectional view taken in the direction of arrows substantially along the line V—V of FIG. 4.
Figure 6A:
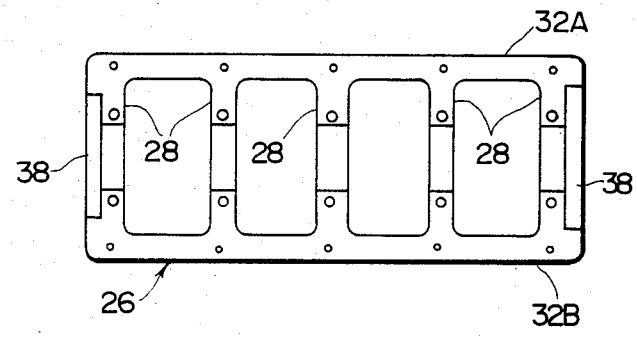
FIGS. 6A, 6B, 6C, 6D and 6E are plan view, front elevation partly in section, left-side view, right-side view, and bottom view, respectively, of a bearing beam structure used in the engine of FIG. 4.
Figure 6B:
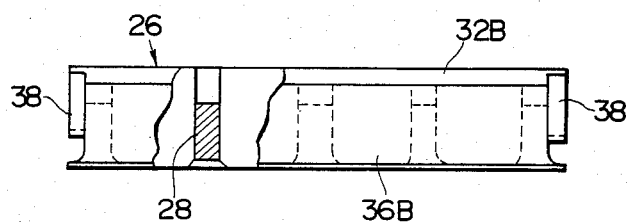
Figure 6C:
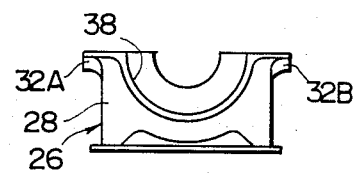
Figure 6D:
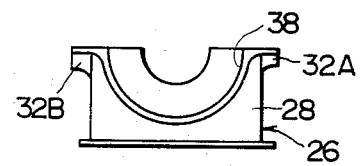
Figure 6E:
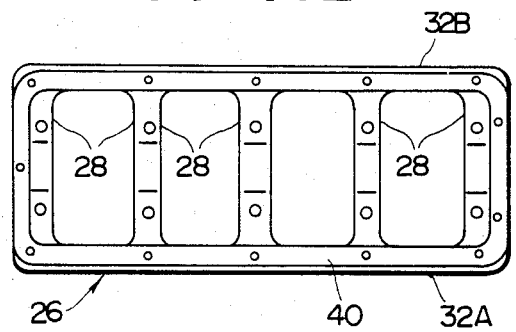

In view of the above description of an automotive internal combustion engine provided with a conventional bearing beam structure, reference is now made to FIGS. 5 to 6E, wherein a preferred embodiment of an internal combustion engine of the present invention is illustrated by the reference numeral 10. The engine 10 in this embodiment is advantageously for an automotive vehicle and comprises a cylinder block 12 which is formed with a plurality of cylinder barrels 14 each of which defines therein a cylinder bore (no numeral). The cylinder block 12 includes a skirt section 16 which bulge outwardly and extends downwardly to define thereinside an upper part of a crankcase (no numeral). The skirt section 16 is integrally connected through a lower block deck 18 with the cylinder barrels 14. A plurality of main bearing bulkheads 20 are aligned parallel with each other and located inside the skirt section 16. Each bearing bulkhead 20 is located below and connected to a portion between two adjacent cylinder barrels 14. The bearing bulkhead 20 is integrally connected at its top part with the lower block deck 18 and at its sides with the inner wall of the skirt section 16. Each bearing bulkhead 20 is provided at its bottom central portion with a bearing section 22 defining a bore 24 in which the journal of a crankshaft (only its axis X is shown) is rotatably disposed.

A bearing beam structure 26 is securely connected to the bottom section of the cylinder block 12 and includes a plurality of main bearing cap section 28. Each bearing cap section 28 together with a respective bearing bulkhead 20 defines the bore 24 and is secured to the bearing bulkhead 20 by means of cap bolts 30 so as to associate the cap sections 28 with the respective bearing sections 22, thereby rotatably supporting the journal of the crankshaft in the bore 24. In this case, the bearing cap section 28 is generally formed in the shape of a rectangle whose top part has a width generally corresponding to that of the widened bottom part of the skirt section 16.

All the bearing cap sections 28 are integrally connected with each other through two elongate beam sections 32A, 32B which extend parallel to the axis X of the crankshaft. The two beam sections 32A, 32B are located or formed respectively along the opposite upper corner portions of each bearing cap section 28. Additionally, the beam sections 32A, 32B are located symmetrically with respect to a vertical plane (not shown) containing the crankshaft axis X and parallel with an axis (not shown) of the cylinder bores. The beams sections 32A, 32B are in the form of a flange and are respectively secured to opposite bottom flange parts of the cylinder block skirt section 16 by means of bolts 34.

Two side wall sections 36A, 36B are provided to form opposite side walls of the bearing beam structure 26. The side wall section 36A is located or formed along one of the opposite side portions of each bearing cap section 28 to integrally connect the bearing cap sections 28 with each other. The side wall section 36B is located or formed along another side portion of each bearing cap section 28 to integrally connect the bearing cap sections 28 with each other. The side wall sections 36A, 36B are preferably formed intergrally with each bearing cap section 28 and respectively with beam sections 32A, 32B which are integral with each bearing cap section 28. Additionally, the front-most and rear-most bearing cap sections 28 are respectively formed at their outside surface with oil seal installation seats 38 each supporting or carrying an oil seal for the crankshaft, as shown in FIGS. 6A to 6D.

In production, the side wall sections 36A, 36B and the beam sections 32A, 32B may be casted integrally with the bearing cap sections 28 by using as the material a light alloy such as aluminium alloy, thereby forming a one-piece bearing beam structure 26. It will be understood that the side wall sections 36A, 36B are positioned outside of the envelope M of the outer-most loci of the big end of a connecting rod (not shown).

As best shown in FIG. 6E, the side wall sections 36A, 36B and the front- and rear-most bearing cap sections 28 are formed at their bottom surface on the same plane to form an endless or continuous flange portion 40 to which the flange portion 42a of an oil pan 42 is secured by means of bolts 44. It will be appreciated that the hollow interior of the bearing beam structure 26 serves as a part of an oil reservoir, and accordingly a relatively small oil pan 42 is sufficient.

With the thus arranged bearing beam structure 26, the beam sections 32A, 32B greatly contribute to improving torsional strength around the axis of the crankshaft and flexural strength around the axis of each cylinder bore. Furthermore, the beam sections 32A, 32B rigidly connect the bearing cap sections 28 with each other, thereby effectively preventing the neighbouring bearing cap sections 28 at their upper parts from moving in a direction to separate from each other. In other words, the strength of the bearing beam structure 26 to resist movement of the bearing cap sections 28 is greatly improved. Besides, the side wall sections 26A and 26B rigidly connect the bearing cap sections 28 at their side portions with each other, thus improving the strength of the bearing cap sections 28 against vibrations applied in crankshaft axis direction to cause them to come down. This greatly contributes to an increase the total strength and rigidity of the bearing beam structure 26. As a result, the bearing beam structure 26 and the bearing sections 22 of the cylinder block 10 are effectively suppressed from pitching movement or generally vertical movement, thereby exhibiting an improved suppressing effect against torsional and flexural vibrations in the lateral and vertical directions. In addition, the beam sections 32A, 32B are rigidly connected to the bottom part of cylinder block skirt section 16 and therefore vibration of the skirt section 16 is further suppressed thereby to remarkably reduce noise emission.

Moreover, in this embodiment, since the small sized oil pan 42 is attached to the bottom part of the bearing beam structure 26 whose interior serves as a part of the oil reservoir, the outer surface area of the oil pan 42 can be reduced without decreasing the oil capacity, thus achieving an increase in its rigidity and a decrease in noise generating surface area from a standpoint of decreasing membrane vibration. It is to be noted that the outer surface of the side wall sections 36A, 36B is much higher in rigidity than that of conventional oil pans, and accordingly the noise level from the surface of the side wall sections 36A, 36B is relatively low as compared with that from a conventional oil pan surface, thereby greatly contributing to total engine noise reduction.

Furthermore, since the bearing beam structure 26 is formed integrally with the crankshaft oil seal installation seats 38, the seal structure for the crankshaft becomes simple and compact, thereby decreasing the number of parts and facilitating assembly thereof while contributing to reduced production cost.

Figure 7:
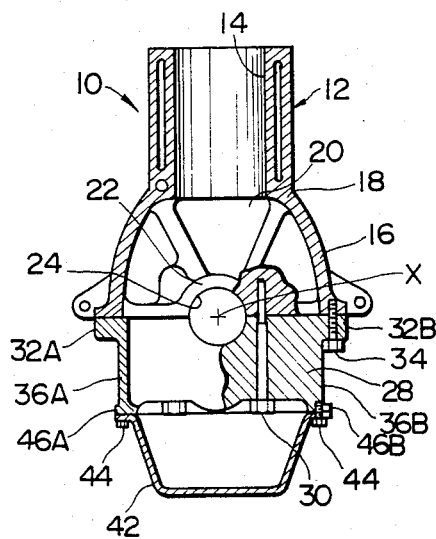
FIG. 7 is a vertical sectional view similar to FIG. 5, but showing another embodiment of the engine in accordance with the present invention.

FIG. 7 shows another embodiment of the engine in accordance with the present invention, in which two additional beam sections 46A, 46B are formed or located along the opposite lower corner portions of each bearing cap section 28 to securely connect all the bearing beam sections 28 at their opposite lower corner portions with each other. The beam sections 46A, 46B are integral with the bearing cap sections 28 and extend parallel to the axis X of the crankshaft. The thus formed additional beam section 46A, 46B constitute to a further improvement in flexural and torsional rigidity. Additionally, by directly connecting the oil pan 42 onto the additional beam sections 46A, 46B which form a part of the bearing beam structure flange portion (40) to which the oil pan 42 is securely attached, vibration input to the oil pan 42 is decreased thus further reducing total engine noise emission.

As will be appreciated from the above, according to the present invention, a plurality of the bearing cap sections are rigidly connected with each other by means of a pair of beam sections formed at opposite upper corner portions of each bearing cap section, and a pair of side wall sections are formed along opposite side portions of each bearing cap section, thereby greatly improving the strength and rigidity of the bearing beam structure. Additionally, beam sections are rigidly connected to the skirt section of the cylinder block. Therefore, vibration noise from the bearing beam structure and the cylinder block is remarkably reduced, thus achieving total engine noise reduction.

What is claimed is:

1. An automotive internal combustion engine comprising:
   a cylinder block having a bottom portion including a plurality of bearing sections; and
   a bearing beam structure secured to the bottom portion, said bearing beam structure including:
   a plurality of main bearing cap sections each of said bearing cap sections being aligned with a respective one of said plurality of bearing sections to form therewith a plurality of axially aligned bores for rotatably supporting a journal of a crankshaft, each of said bearing cap sections including opposed substantially vertical side portions defining a surface area;
   first and second side walls respectively connected respectively with substantially the entire surface area of said opposing side portions of said plurality of bearing cap sections to securely connect said bearing cap sections with each other, said first and second side walls extending generally parallel to an axis of said axially aligned bores;
   first and second beam sections respectively attached to and connecting opposite upper corner portions of said plurality of bearing cap sections, said first and second beam sections being integral with and projecting outwardly from said first and second side walls, respectively, and extending parallel with said axis; and
   third and fourth beam sections respectively attached to and securely connecting opposite lower corner portions of said plurality of bearing cap sections, said third and fourth beam sections projecting outwardly from said first and second side walls, respectively, and extending parallel with said axis.

2. An automotive internal combustion engine as claimed in claim 1, wherein said first and second beam sections are integrally formed with said bearing cap sections and extend generally parallel to said axis.

3. An automotive internal combustion engine as claimed in claim 1, wherein said first and second side walls are integrally formed with said bearing cap sections.

4. An automotive internal combustion engine as claimed in claim 1, further comprising first and second oil seal installation seats for receiving an oil seals, said first and second oil seal installation seats being disposed at opposite longitudinal ends of said bearing beam structure adjacent two of said plurality of bearing cap sections.

5. An automotive internal combustion engine as claimed in claim 1, wherein said cylinder block has a skirt section and said first and second beam sections are secured to the skirt section.

6. An automotive internal combustion engine as claimed in claim 5, wherein said skirt section has a bottom part and said bearing cap sections are generally rectangular as viewed in a direction orthogonal to the axis, an upper part of said bearing cap sections having a width generally corresponding to a width of the bottom part of the skirt section, each of said bearing cap sections being securely connected to said respectively aligned bearing sections.

7. An automotive internal combustion engine as claimed in claim 1, wherein said bearing beam structure has a bottom portion and further comprising an oil pan securely connected to said bottom portion to form therewith a crankcase defined by an interior of the oil pan and an interior of said bearing beam structure.

8. An automotive internal combustion engine as claimed in claim 7, wherein said oil pan has a flange portion, said flange portion being connected to said third and fourth beam sections to form said crankcase.

* * * * *